United States Patent
Konishi

(10) Patent No.: US 11,360,664 B2
(45) Date of Patent: Jun. 14, 2022

(54) DISPLAY DEVICE CAPABLE OF DISPLAYING SOFTWARE KEYBOARD WITHOUT OVERLAP WITH PLURAL FIELDS AND NON-TRANSITORY COMPUTER-READABLE RECORDING MEDIUM WITH DISPLAY CONTROL PROGRAM STORED THEREON

(71) Applicant: KYOCERA Document Solutions Inc., Osaka (JP)

(72) Inventor: Kohei Konishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 134 days.

(21) Appl. No.: 16/777,260

(22) Filed: Jan. 30, 2020

(65) Prior Publication Data
US 2020/0257446 A1    Aug. 13, 2020

(30) Foreign Application Priority Data
Feb. 13, 2019  (JP) .............................. JP2019-023900

(51) Int. Cl.
*G06F 3/04886*   (2022.01)
*G06F 3/14*   (2006.01)
(Continued)

(52) U.S. Cl.
CPC ........ *G06F 3/04886* (2013.01); *G06F 3/0238* (2013.01); *G06F 3/0658* (2013.01);
(Continued)

(58) Field of Classification Search
CPC ........ G06F 3/0488; G06F 3/14; G06F 3/0412; G06F 3/0414; G06F 3/04886;
(Continued)

(56) References Cited

U.S. PATENT DOCUMENTS

| | | | |
|---|---|---|---|
| 9,244,604 B1 * | 1/2016 | Lewbel | G06F 3/0488 |
| 2013/0088439 A1 * | 4/2013 | Shih | G06F 3/016 |
| | | | 345/173 |
| 2013/0203469 A1 * | 8/2013 | Cho | G06F 3/04886 |
| | | | 455/566 |
| 2013/0300668 A1 * | 11/2013 | Churikov | G06F 3/041 |
| | | | 345/168 |

(Continued)

FOREIGN PATENT DOCUMENTS

| | | | |
|---|---|---|---|
| AU | 2018414730 | * | 9/2019 |
| JP | 2007-183787 A | | 7/2007 |

OTHER PUBLICATIONS

Anonymous. IPCOM000242095D, Jun. 18, 2015. (Year: 2015).*
(Continued)

*Primary Examiner* — Julie Anne Watko
(74) *Attorney, Agent, or Firm* — IP Business Solutions, LLC

(57) ABSTRACT

A display device includes a display panel and a control device. The control device functions as a determiner and a controller. The determiner determines, with a plurality of fields displayed on a screen of the display panel, whether or not an entire software keyboard is displayable without overlap with the plurality of fields on the screen of the display panel. The controller allows for, when the determiner determines that the entire software keyboard is displayable without overlap, display of the software keyboard without overlap with the plurality of fields or allows for, when the determiner determines that the entire software keyboard is not displayable without overlap, display of the software keyboard in a split form or display of the software keyboard in a partial form composed only of a portion of the software keyboard in a region of the screen out of the plurality of fields.

4 Claims, 13 Drawing Sheets

(51) Int. Cl.
*G06F 3/023* (2006.01)
*G06F 3/06* (2006.01)
*G06F 3/0488* (2022.01)

(52) U.S. Cl.
CPC .......... *G06F 3/0233* (2013.01); *G06F 3/0488* (2013.01); *G06F 3/14* (2013.01)

(58) Field of Classification Search
CPC .... G06F 3/0238; G06F 3/0658; G06F 3/0602; G06F 3/0601; G06F 3/06; G06F 3/0629; G06F 3/0489; G06F 3/04879; G06F 3/0481; G06F 3/048; G06F 3/0484; G06F 3/03; G06F 3/0233; G06F 3/023; G06F 3/02; G06F 3/017; G06F 3/016; G06F 3/01; G06F 3/00
See application file for complete search history.

(56) References Cited

U.S. PATENT DOCUMENTS

| | | | | |
|---|---|---|---|---|
| 2014/0006994 | A1* | 1/2014 | Koch | G06F 1/169 715/773 |
| 2014/0203953 | A1* | 7/2014 | Moser | G06F 3/016 341/27 |
| 2021/0117049 | A1* | 4/2021 | Zhu | G06F 3/04886 |
| 2021/0303147 | A1* | 9/2021 | Guerrero | G06F 3/04886 |

OTHER PUBLICATIONS

Imperva, "A CAPTCHA in the Rye", Hacker Intelligence Initiative, Monthly Trend Report #11, ADC Monthly Web Attacks Analysis, 2012. (Year: 2012).*

* cited by examiner

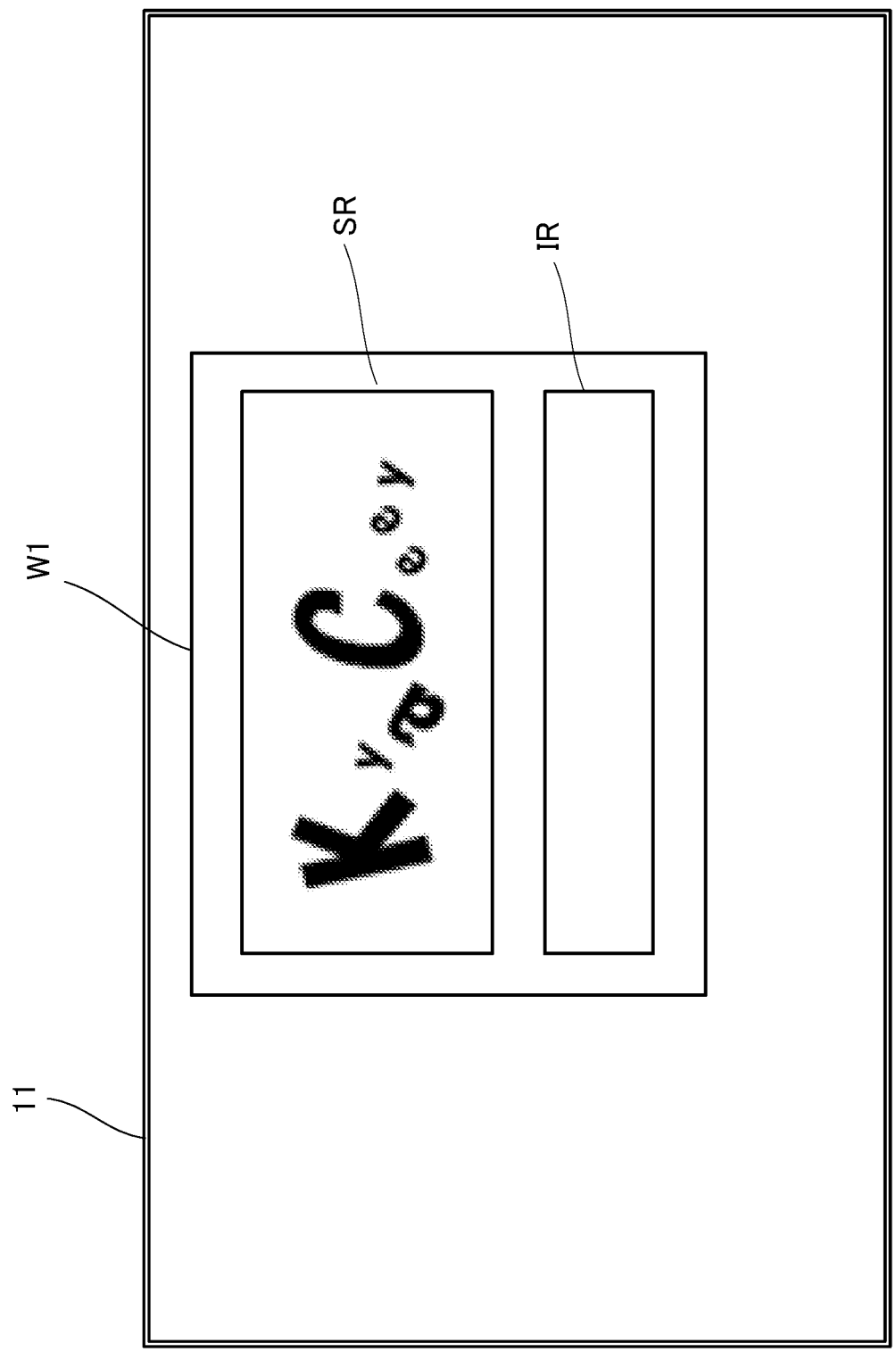

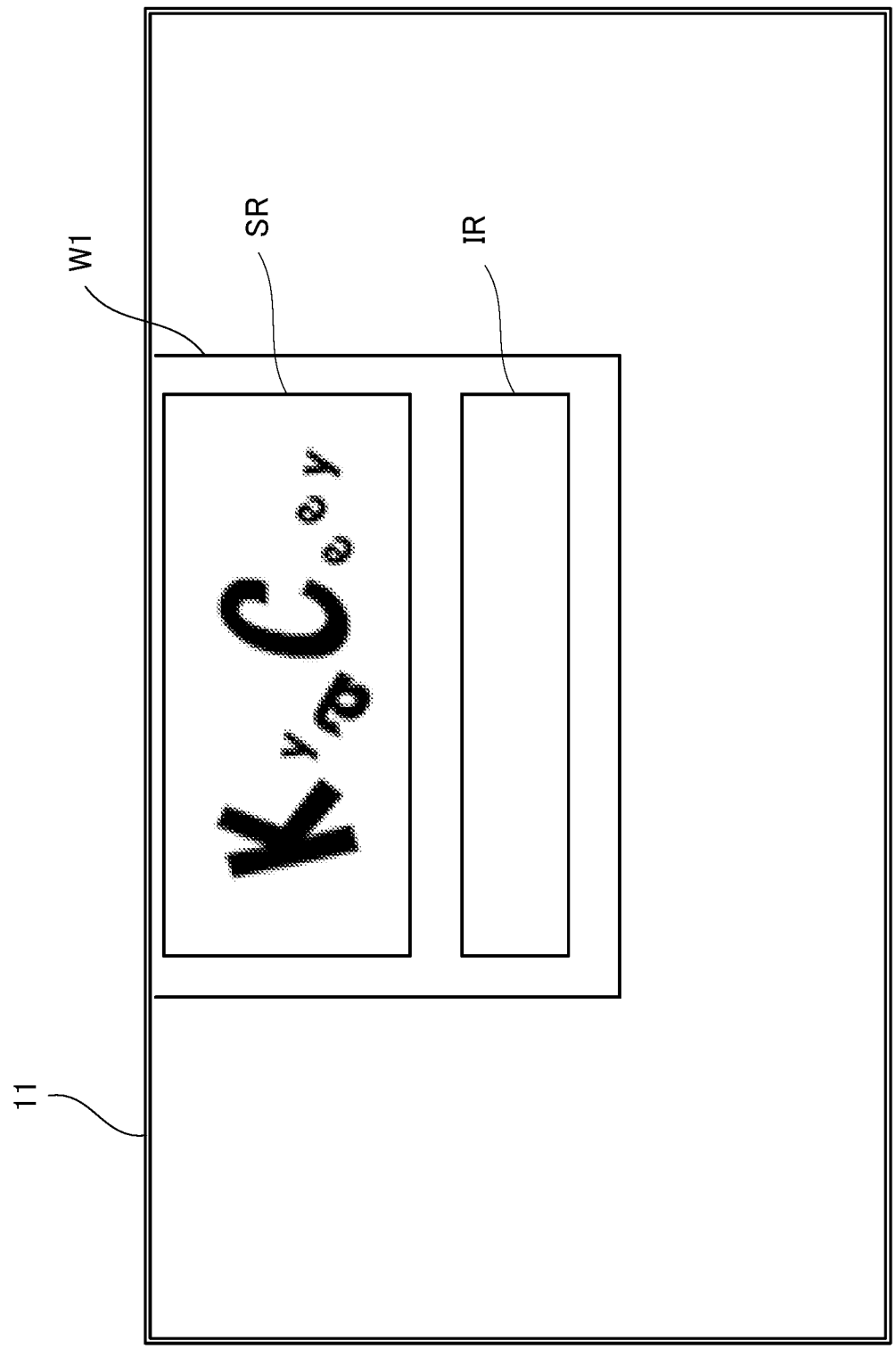

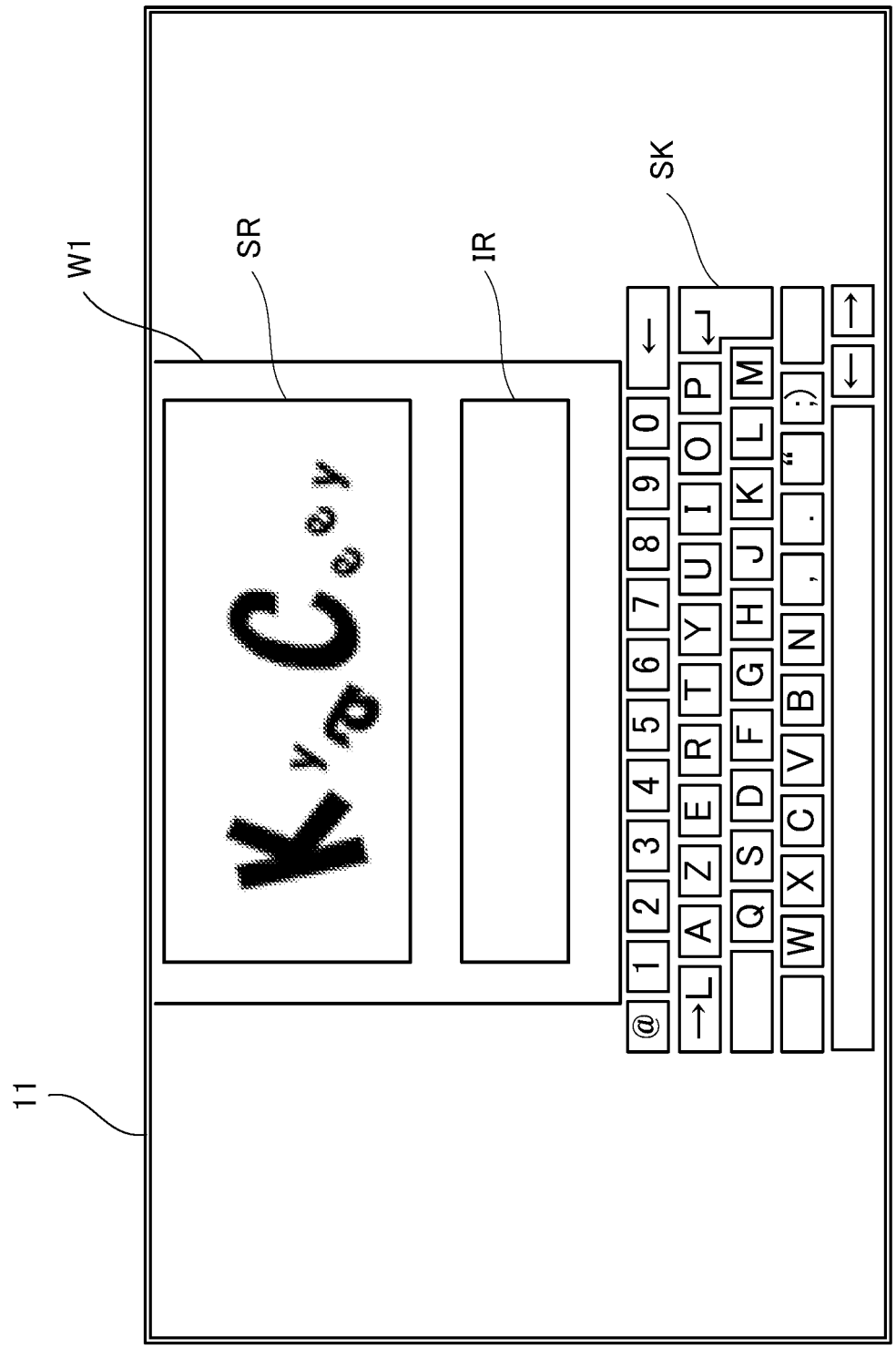

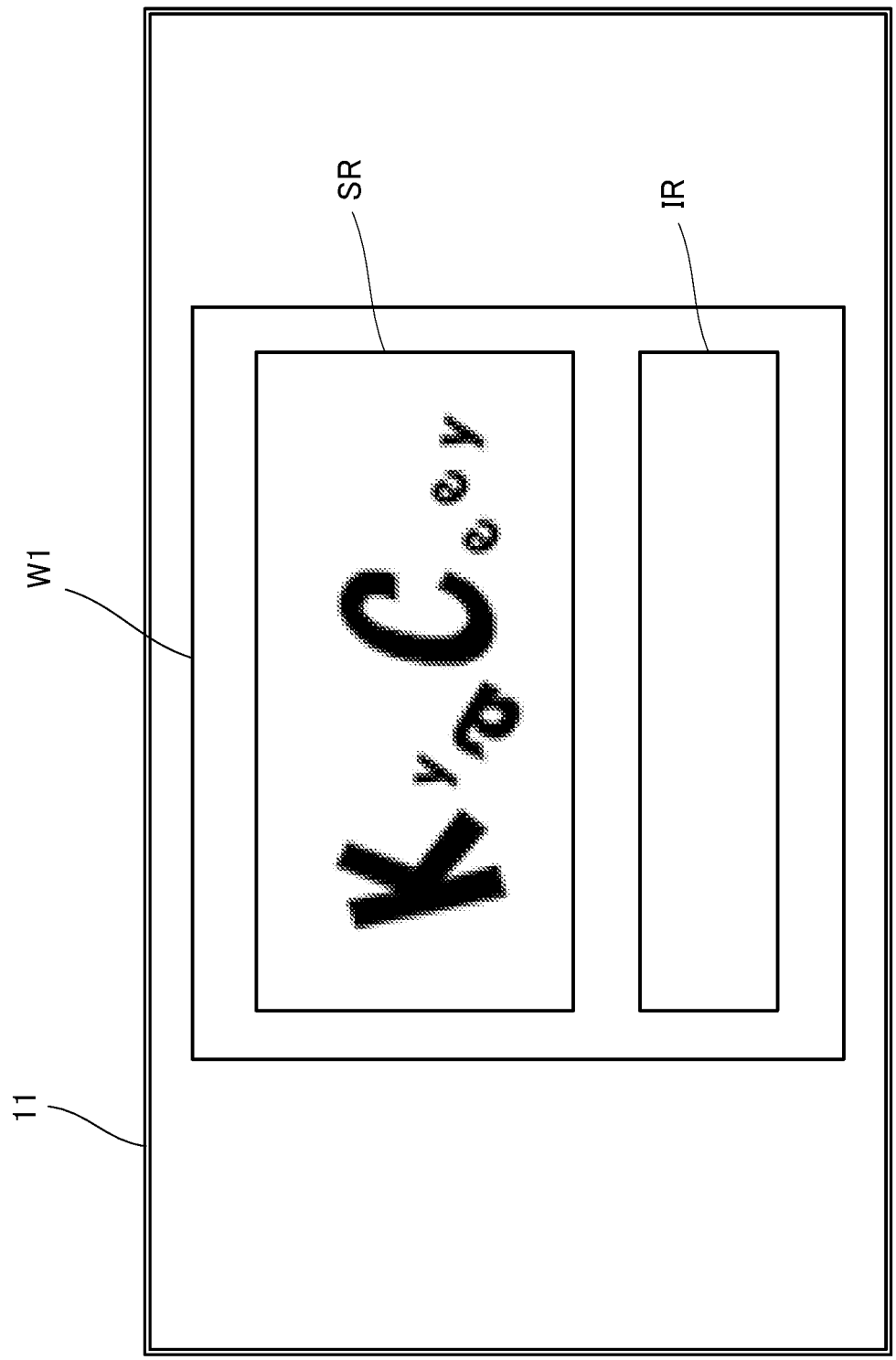

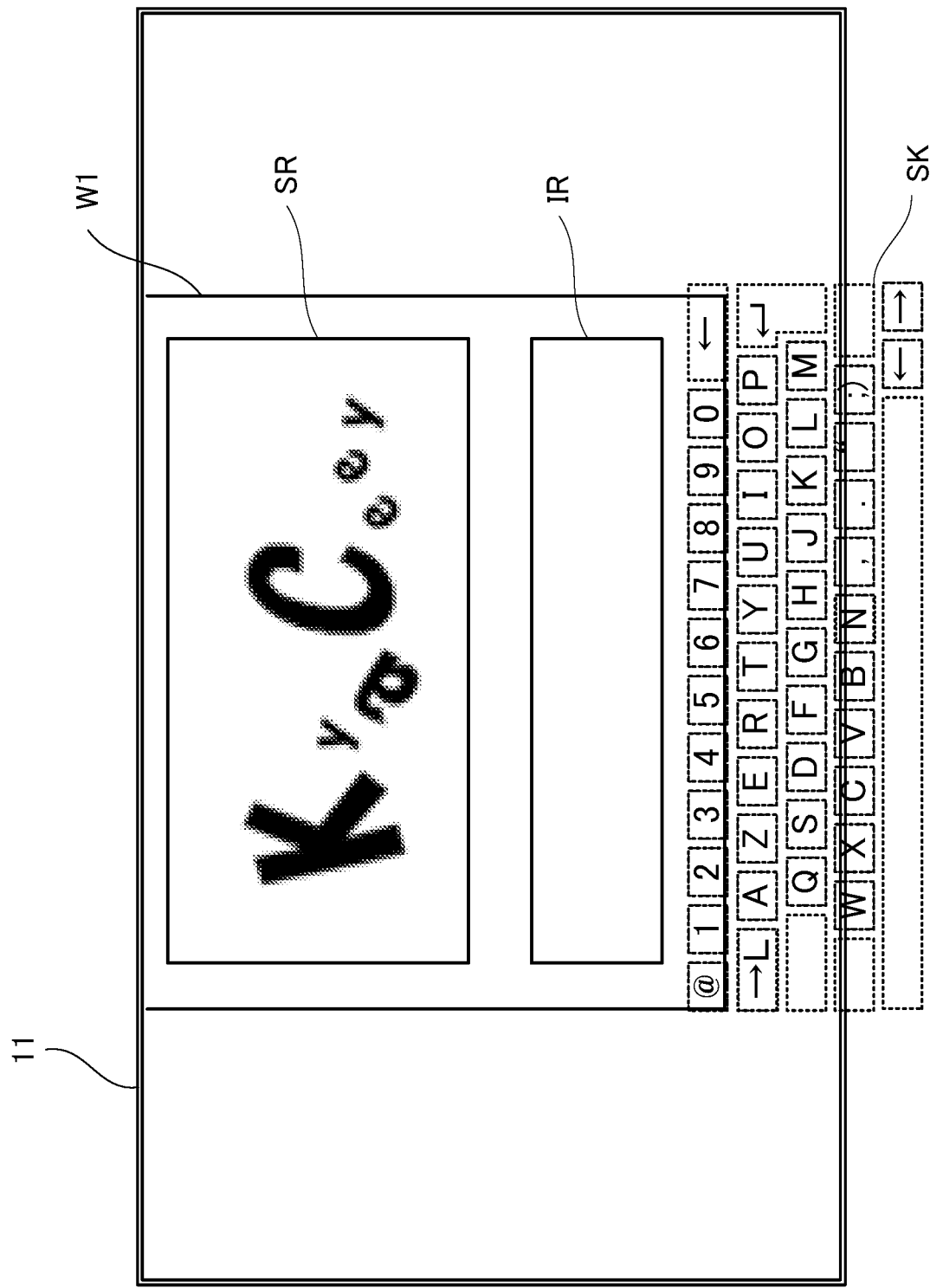

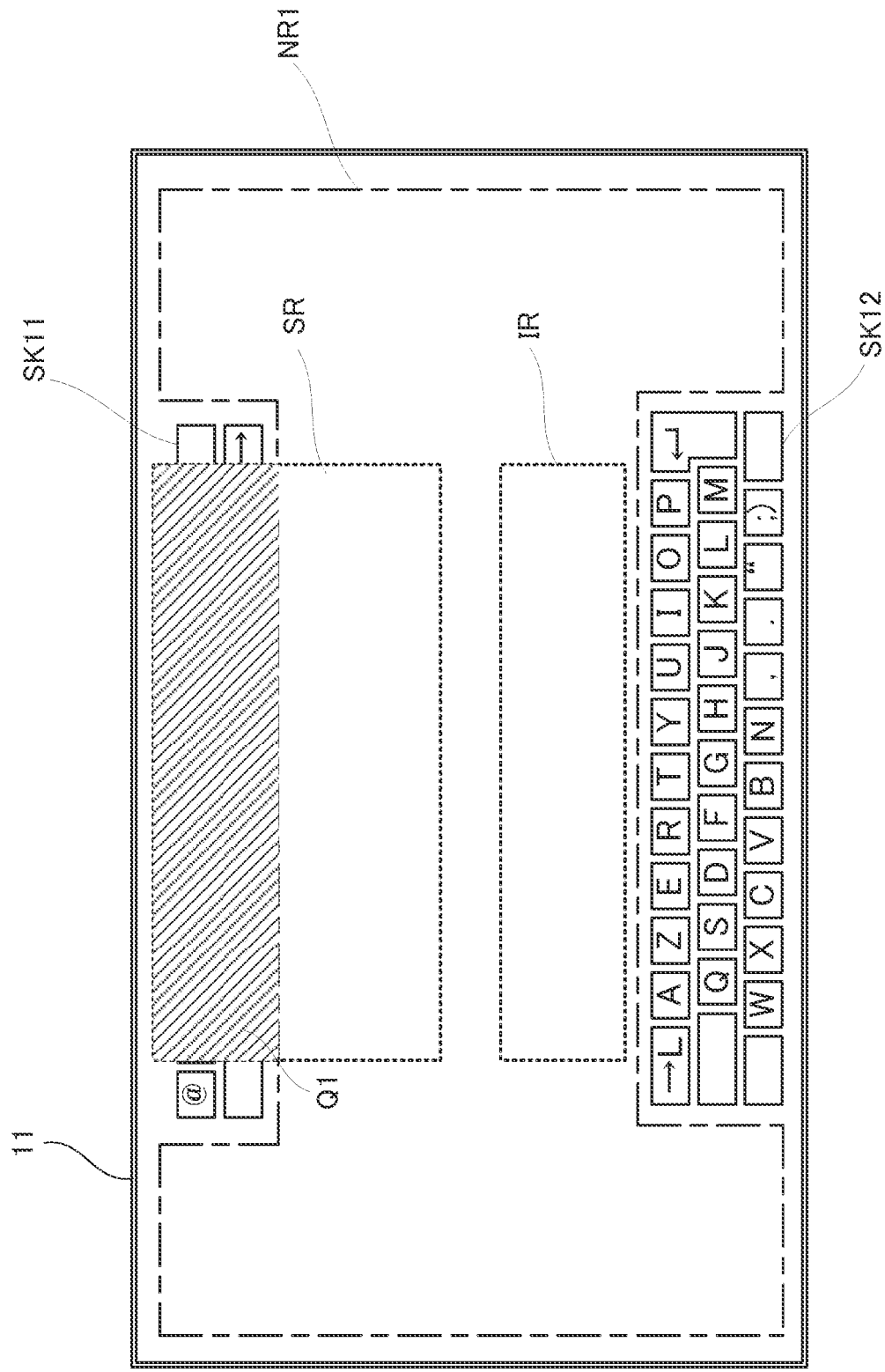

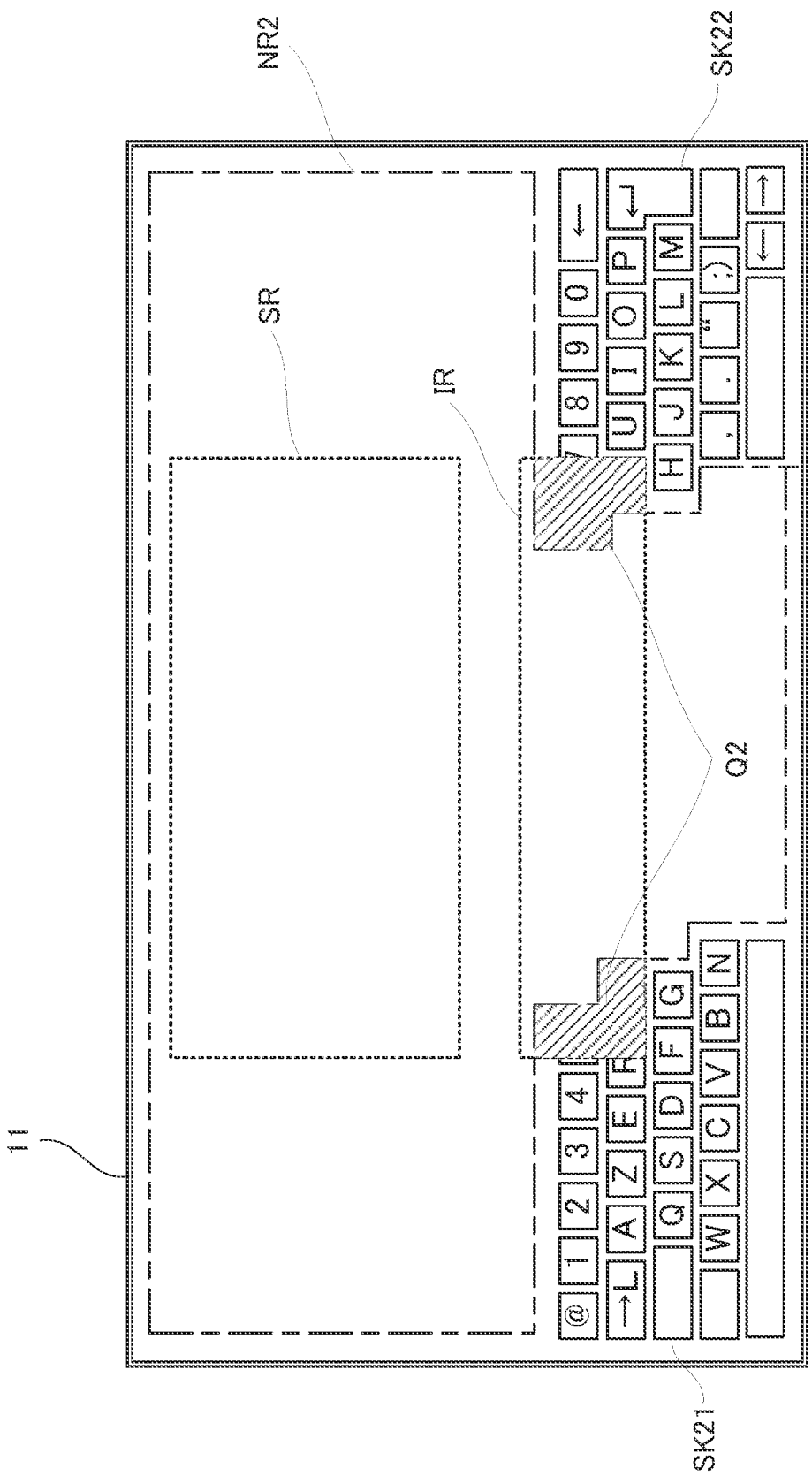

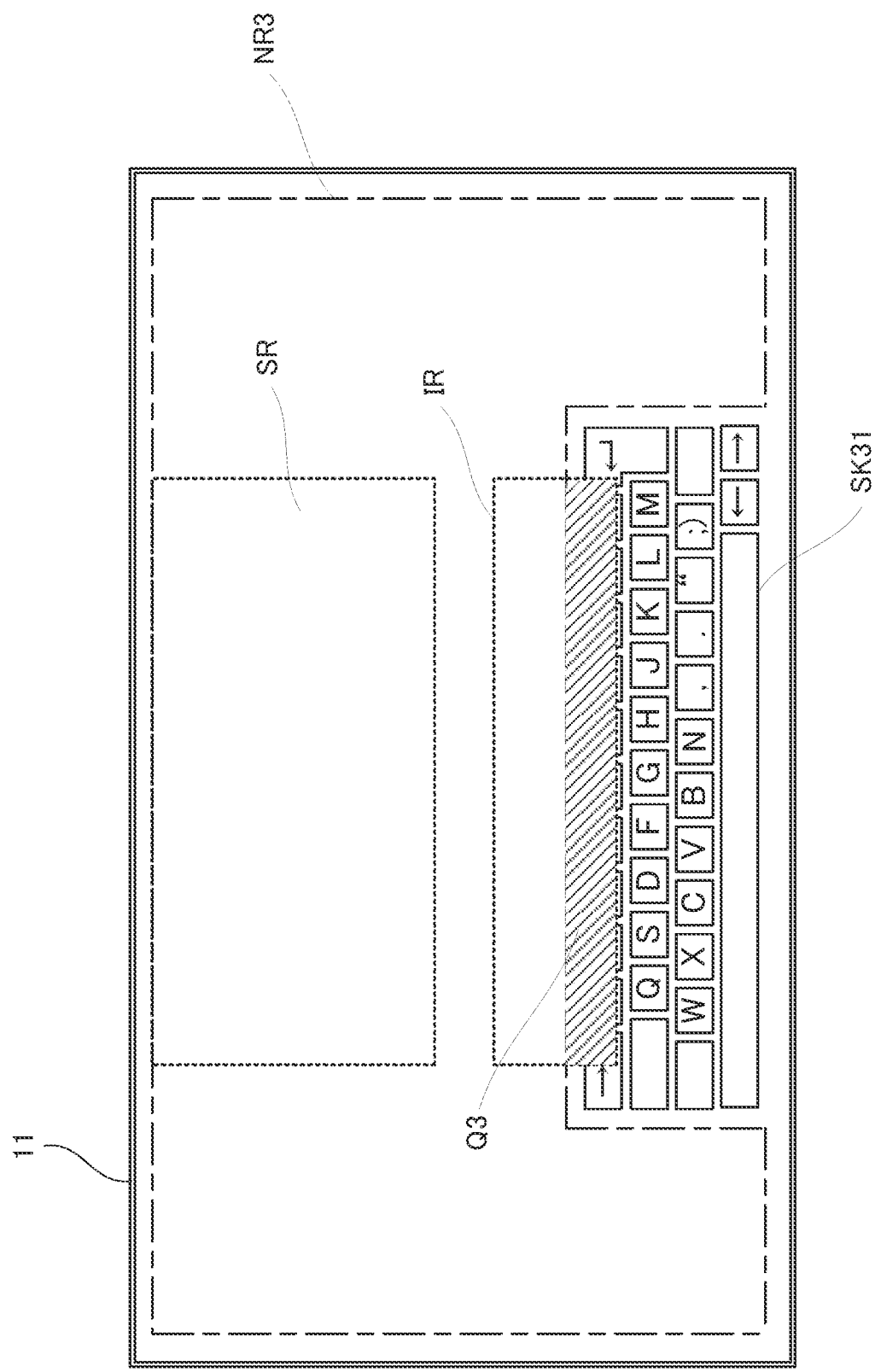

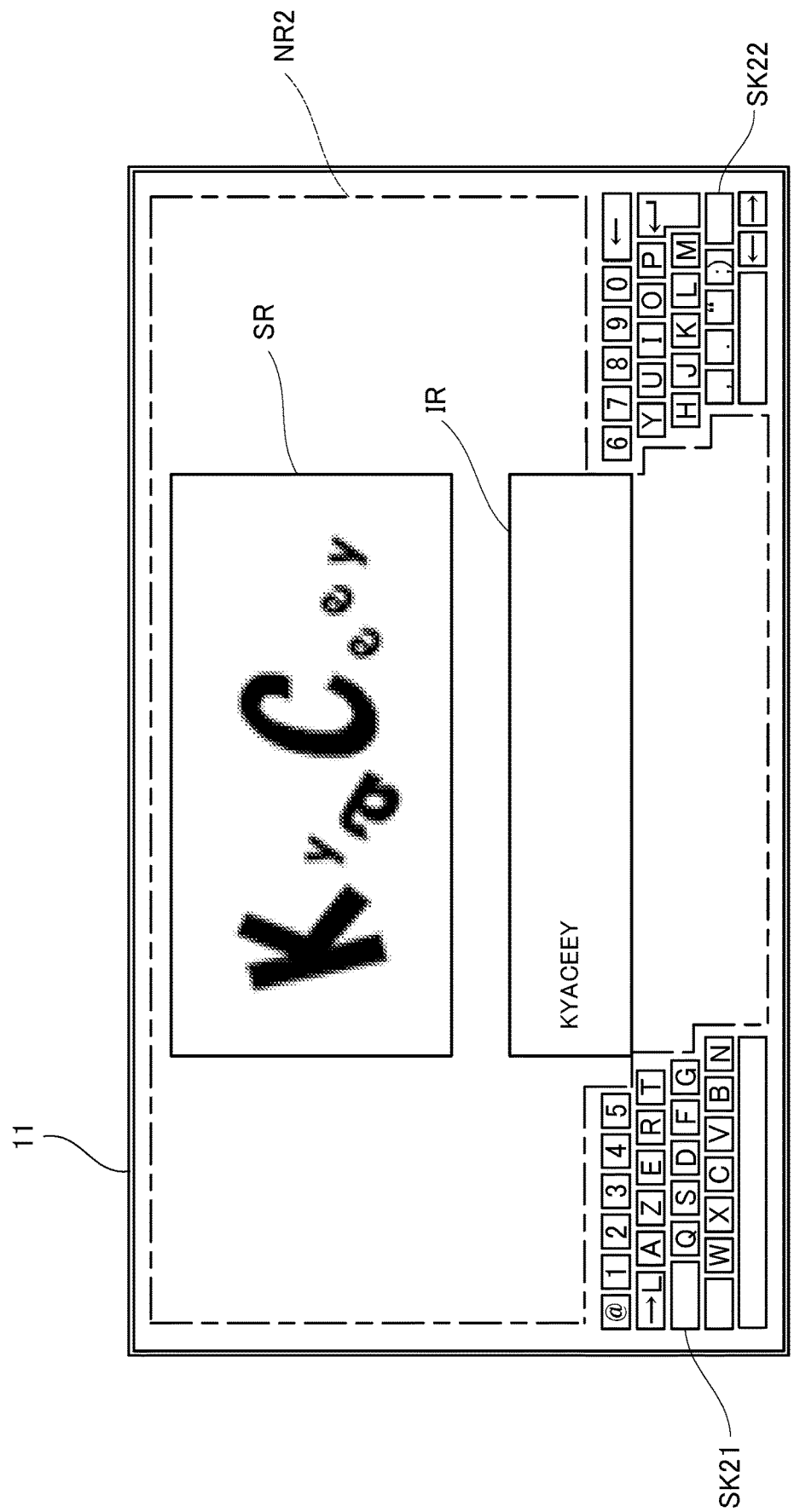

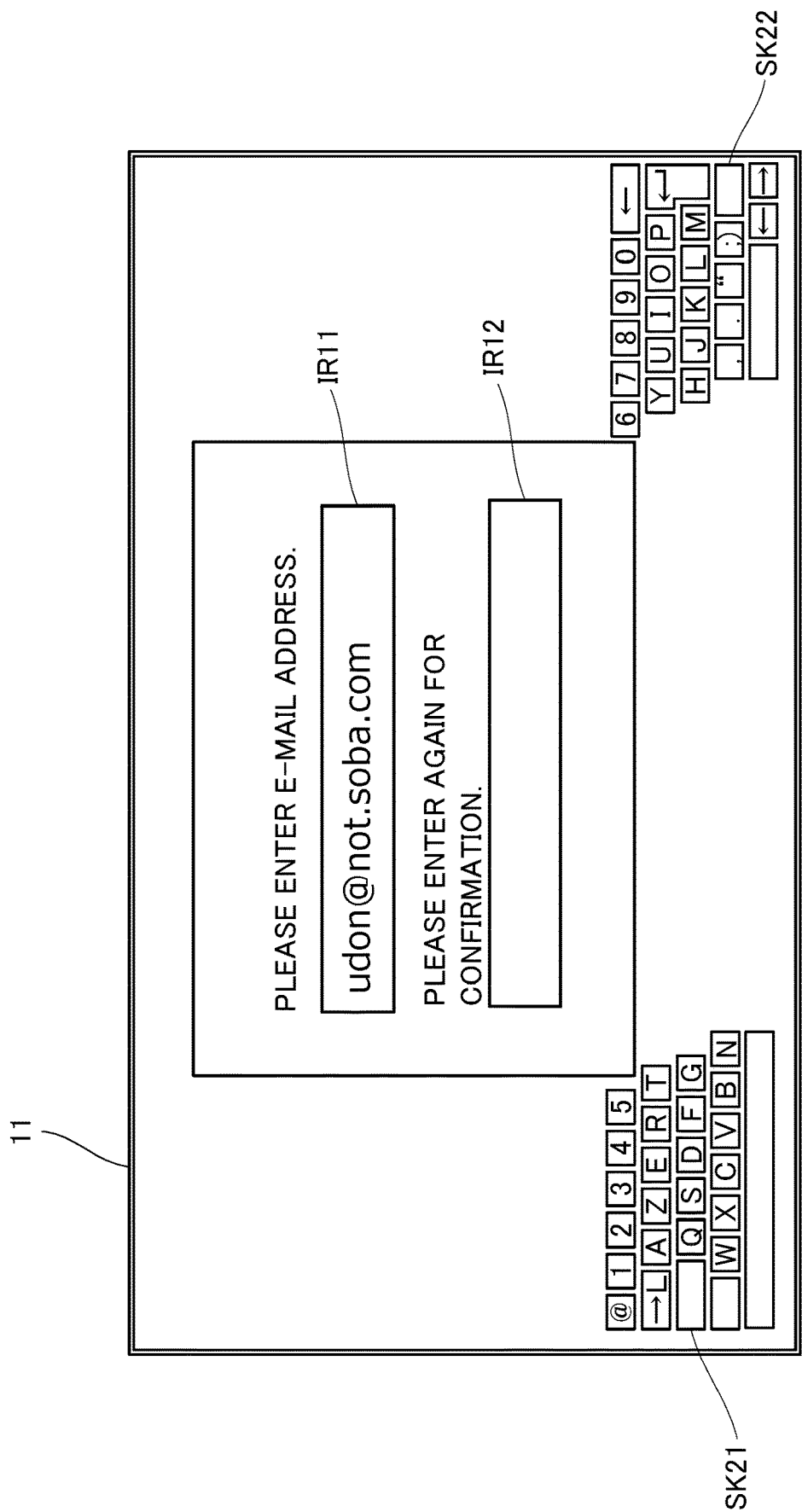

Fig.9
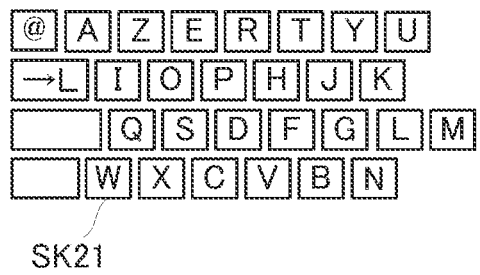
SK21
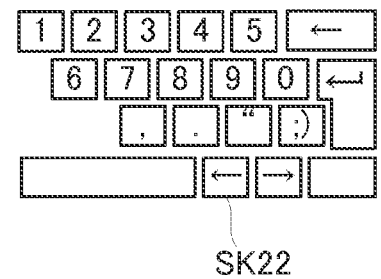
SK22
Fig.10
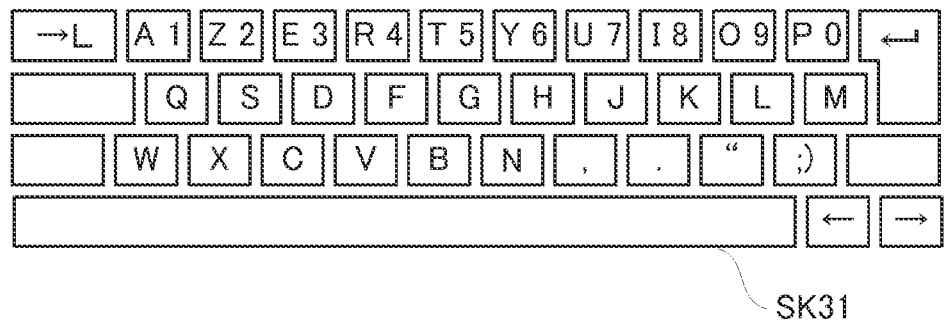
SK31

DISPLAY DEVICE CAPABLE OF DISPLAYING SOFTWARE KEYBOARD WITHOUT OVERLAP WITH PLURAL FIELDS AND NON-TRANSITORY COMPUTER-READABLE RECORDING MEDIUM WITH DISPLAY CONTROL PROGRAM STORED THEREON

INCORPORATION BY REFERENCE

This application claims priority to Japanese Patent Application No. 2019-023900 filed on 13 Feb. 2019, the entire contents of which are incorporated by reference herein.

BACKGROUND

The present disclosure relates to display devices and display control programs and particularly relates to a technique for displaying a software keyboard on a screen of a display panel.

There is generally known a display device in which a software keyboard, instead of a hardware keyboard, is displayed on a screen of a display panel, a touch gesture on a key of the software keyboard is detected by a touch panel provided on the screen of the display panel, and a character, a symbol and so on associated with the key on which the touch gesture has been made is thus entered. There is also known a display device in which the display of a software keyboard and display information on a screen of a display panel is made by an opaque display where the display information is hidden by the software keyboard or a see-through display where both the display information and the software keyboard are seen simultaneously in a layered relation.

SUMMARY

A technique improved over the aforementioned techniques is proposed as one aspect of the present disclosure.

A display device according to an aspect of the present disclosure includes a display panel and a control device. The control device includes a processor and functions, through the processor executing a display control program, as a determiner and a controller. The determiner determines, with a plurality of fields displayed on a screen of the display panel, whether or not an entire software keyboard is displayable without overlap with the plurality of fields on the screen of the display panel. The controller allows for, when the determiner determines that the entire software keyboard is displayable without overlap, display of the software keyboard without overlap with the plurality of fields or allows for, when the determiner determines that the entire software keyboard is not displayable without overlap, display of the software keyboard in a split form or display of the software keyboard in a partial form composed only of a portion of the software keyboard in a region of the screen out of the plurality of fields.

A non-transitory computer-readable recording medium according to another aspect of the present disclosure stores a display control program that, when on a computer including a display panel and a processor the processor executes the display control program, allows the computer to function as a determiner and a controller. The determiner determines, with a plurality of fields displayed on a screen of the display panel, whether or not an entire software keyboard is displayable without overlap with the plurality of fields on the screen of the display panel. The controller allows for, when the determiner determines that the entire software keyboard is displayable without overlap, display of the software keyboard without overlap with the plurality of fields or allows for, when the determiner determines that the entire software keyboard is not displayable without overlap, display of the software keyboard in a split form or display of the software keyboard in a partial form composed only of a portion of the software keyboard in a region of the screen out of the plurality of fields.

BRIEF DESCRIPTION OF THE DRAWINGS

FIG. 4A is a view showing a window for image authentication displayed on a screen of a display panel.

FIG. 4B is a view showing a state where the window for image authentication has been moved on the screen of the display panel.

FIG. 4C is a view showing a state where the software keyboard is additionally displayed on the screen of the display panel.

FIG. 5A is a view showing another window for image authentication displayed on the screen of the display panel.

FIG. 5B is a view showing a state where the software keyboard cannot be additionally displayed on the screen of the display panel.

FIG. 6A is a view showing a state where the software keyboard split into upper and lower portions is displayed on the screen of the display panel.

FIG. 6B is a view showing a state where the software keyboard split into left and right portions is displayed on the screen of the display panel.

FIG. 6C is a view showing a state where a simplified software keyboard is displayed on the screen of the display panel.

FIG. 7 is a view showing a state where the software keyboard split into right and left portions is reduced in size and thus displayed to fall within a keyboard display region of the screen.

FIG. 8 is a view showing a state where a window containing two entry fields is displayed on the screen of the display panel.

FIG. 9 is a view showing a modification of the software keyboard split into right and left portions.

FIG. 10 is a view showing a modification of the simplified software keyboard.

DETAILED DESCRIPTION

Hereinafter, a description will be given of an embodiment of the present disclosure with reference to the drawings.

Figure 1:
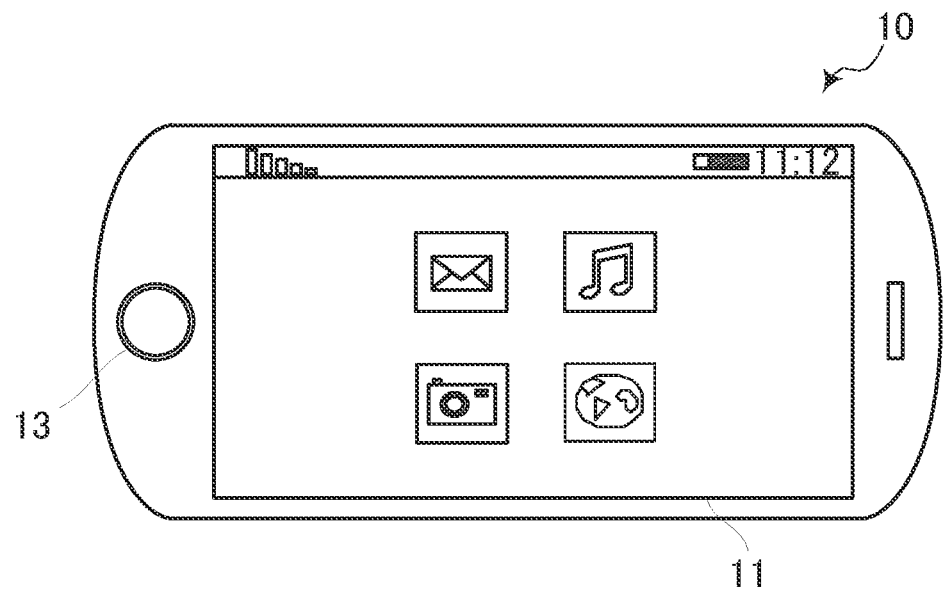
FIG. 1 is a plan view showing the appearance of a mobile terminal device for which a display device according to one embodiment of the present disclosure is applied.
Figure 2:
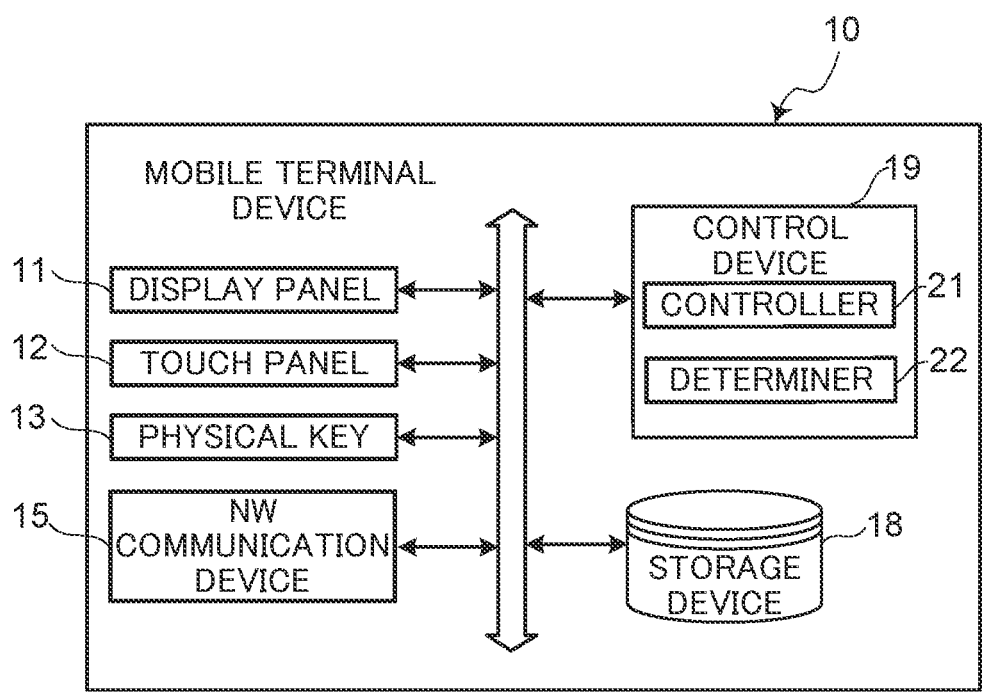
FIG. 2 is a block diagram showing an internal configuration of the mobile terminal device according to the one embodiment.

FIG. 1 is a plan view showing the appearance of a mobile terminal device for which a display device according to an embodiment of the present disclosure is applied. FIG. 2 is a block diagram showing an internal configuration of the mobile terminal device according to the embodiment.

The mobile terminal device 10 according to this embodiment is, for example, a smartphone or a mobile information device and includes a display panel 11, a touch panel 12, a physical key 13, a network communication device (NW communication device) 15, a storage device 18, and a control device 19. These components are capable of transferring data or signals to and from each other via a bus.

The display panel 11 is formed of a liquid crystal display (LCD), an organic EL (OLED: organic light-emitting diode) or others. For example, a plurality of icons are displayed on the screen of the display panel 11.

The touch panel 12 is a touch panel of a resistive film system, a capacitance system or any other system. The touch panel 12 is disposed on the screen of the display panel 11 and is capable of detecting a touch on the touch panel 12 with a user's finger or the like, together with a point of touch. The touch panel 12 allows a user's instruction on the screen of the display panel 11 to be input through the touch panel 12. Therefore, the touch panel 12 serves as an operation device through which a user's operation by gesture on the screen of the display panel 11 is to be input.

The mobile terminal device 10 further includes, in addition to the above touch panel 12, a physical key 13 as an operation device through which a user's operation is to be input.

The network communication device 15 is a communication interface including a communication module, such as a LAN (local area network) chip. The network communication device 15 is connected via a LAN, the Internet or the like to external terminal devices, such as a server.

The storage device 18 is a storage device, such as a RAM (random access memory) or an HDD (hard disk drive), and stores various application programs and various types of data.

The control device 19 is formed of a processor, a RAM (random access memory), a ROM (read only memory), and so on. The processor is, for example, a CPU (central processing unit), an ASIC (application specific integrated circuit) or an MPU (micro processing unit). When a display control program stored in the above ROM or the storage device 18 is executed by the above processor, the control device 19 functions as a controller 21 and a determiner 22.

The control device 19 is connected to the display panel 11, the touch panel 12, the physical key 13, the network communication device 15, the storage device 18, and so on. The controller 21 performs the operation control of each of the above components and signal or data transfer to and from each of the components.

The controller 21 serves as a processor that executes various types of processing. Furthermore, the controller 21 has the functions of controlling the display operation of the display panel 11 and controlling the communication operation of the network communication device 15.

The determiner 22 performs processing for determining, in a state where the controller 21 allows a plurality of entry or reference fields to be displayed on the screen of the display panel 11, whether or not the entire software keyboard is displayable without overlap with the plurality of entry or reference fields on the screen of the display panel 11.

When performing, for example, image authentication (such as CAPTCHA[SM] (Completely Automated Public Turing test to tell Computers and Humans Apart)), on the mobile terminal device 10 having the above structure, the controller 21 allows the display panel 11 to display on the screen an entry field for entering characters or symbols and a reference field for displaying an image representing the characters or symbols and also allows the display panel 11 to display a software keyboard together with the entry field and reference field on the screen. In doing so, when the determiner 22 has determined that the entire software keyboard is displayable without overlap with the entry field and reference field on the screen of the display panel 11, the controller 21 allows the software keyboard to be displayed without overlap with the entry field and reference field. On the other hand, when the determiner 22 has determined that the entire software keyboard is not displayable without overlap, the controller 21 allows the software keyboard to be displayed in a form split into upper and lower portions, in a form split into left and right portions or in a partial form composed only of a portion of the software keyboard and allows the entry field or the reference field to be displayed in a region of the screen out of the software keyboard. Thus, the software keyboard is displayed without overlap with the reference field and entry field. Therefore, the user can operate the software keyboard while viewing the entry field or the reference field to enter, into the entry field, characters or symbols corresponding to an image in the reference field, and thus perform image authentication.

Next, a detailed description will be given of processing for allowing the software keyboard to be displayed without overlap with the reference field and entry field, by taking image authentication as an example and with reference to the flowchart shown in FIG. 3 and so on.

First, the controller 21 runs an application for image authentication stored in the storage device 18 or an application for image authentication sent from an external server or the like and received by the network communication device 15 and operates according to the application to allow the display panel 11 to display a window W1 for image authentication on the screen as shown in FIG. 4A (step S101). In the window W1 for image authentication shown in FIG. 4A, an entry field IR for entering characters or symbols and a reference field SR for displaying an image representing the characters or symbols are displayed. In generating the window W1 for image authentication, the controller 21 sets, based on the above application, the respective positions of the window W1, the entry field IR, and the reference field SR in the screen of the display panel 11 and the determiner 22 acquires these positions from the controller 21 (step S102). These positions are, for example, the coordinates of the four corners of the window W1, the coordinates of the four corners of the entry field IR, and the coordinates of the four corners of the reference field SR.

When, with the window W1 for image authentication displayed on the screen of the display panel 11 in the above manner, the user makes a touch gesture on the entry field IR, the controller 21 detects, through the touch panel 12, the touch gesture on the entry field IR (step S103) and moves the window W1 on the screen of the display panel 11 to bring the entry field IR and the reference field SR close to one side of the screen of the display panel 11 as shown in FIG. 4B. Thus, the region of the screen not overlapping with the entry field IR and the reference field SR is enlarged. Thereafter, the determiner 22 acquires, from the controller 21, the respective positions of the window W1, the entry field IR, and the reference field SR in the screen of the display panel 11 at the time of completion of the processing for bringing the window W1 close to the one side of the screen (step S104).

Then, based on the positions of the entry field IR and the reference field SR acquired in step S104, the determiner 22 determines whether or not the whole of the preset software keyboard is displayable without overlap with the entry field IR and reference field SR on the screen of the display panel 11 (step S105). When the determiner 22 determines that the whole of the software keyboard is displayable without overlap ("Yes" in step S105), the controller 21 reads image data on the software keyboard from the storage device 18 and, as shown in FIG. 4C, allows the display panel 11 to display the software keyboard SK at a location not overlapping with the entry field IR and reference field SR on the screen (step S106).

On the other hand, because the sizes of the window W1, the entry field IR, and the reference field SR are too large as shown as an example in FIG. 5A, even if the entry field IR and the reference field SR are brought close to one side of the screen of the display panel 11 to enlarge the region of the screen not overlapping with the entry field IR and reference field SR, the entire software keyboard SK may not be able to be displayed without overlap with the entry field IR and reference field SR on the screen of the display panel 11 (see FIG. 5B). In this case, the determiner 22 determines that the software keyboard SK is not displayable without overlap with the entry field IR and reference field SR on the screen of the display panel 11 ("No" in step S105).

Then, the determiner 22 calculates: the total area Q1 of regions where an upper software keyboard SK11 and a lower software keyboard SK12 obtained by splitting the software keyboard SK into upper and lower portions as shown as an example in FIG. 6A overlap with the entry field IR and the reference field SR if the controller 21 allows for the display of the upper software keyboard SK11 on an uppermost portion of the screen of the display panel 11 and the display of the lower software keyboard SK12 on a lowermost portion of the screen of the display panel 11; the total area Q2 of regions where a left software keyboard SK21 and a right software keyboard SK22 obtained by splitting the software keyboard SK into left and right portions as shown as an example in FIG. 6B overlap with the entry field IR and the reference field SR if the controller 21 allows for the display of the left software keyboard SK21 on a leftmost portion of the screen of the display panel 11 and the display of the right software keyboard SK22 on a rightmost portion of the screen of the display panel 11; and the area Q3 where a software keyboard SK31 obtained by simplifying the software keyboard SK as shown in FIG. 6C overlaps with the entry field IR and the reference field SR if the controller 21 allows for the display of the software keyboard SK31 on the lowermost portion of the screen of the display panel 11, and selects from among the above three types of software keyboard a type of software keyboard having the smallest of the areas Q1 to Q3 (step S107). The determiner 22 acquires, from the controller 21, the respective positions of the window W1, the entry field IR, and the reference field SR in the screen of the display panel 11 in each of the above three cases of display and calculates the areas Q1 to Q3 based on these positions, the respective areas of the window W1, the entry field IR, and the reference field SR, and the area of a region of the screen of the display panel 11 where an image is displayable out of the entry field IR and the reference field SR.

Suppose that the software keyboards SK11 and SK12 shown in FIG. 6A are obtained by splitting the software keyboard SK shown in FIG. 4C into upper and lower portions and a region of the screen other than the software keyboards SK11 and SK12 is defined as a keyboard non-display region NR1. Furthermore, suppose that the software keyboards SK21 and SK22 shown in FIG. 6B are obtained by splitting the software keyboard SK shown in FIG. 4C into left and right portions and a region of the screen other than the software keyboards SK21 and SK22 is defined as a keyboard non-display region NR2. Moreover, suppose that the simplified software keyboard SK31 shown in FIG. 6C is obtained by omitting a plurality of keys associated with numbers in the software keyboard SK shown in FIG. 4C and is composed of a plurality of keys mainly associated with characters in the software keyboard SK and a region of the screen other than the software keyboard SK31 is defined as a keyboard non-display region NR3.

For example, when the determiner 22 determines that the area Q2 where the left and right software keyboards SK21 and SK22 overlap with the entry field IR and the reference field SR is the smallest area, the determiner 22 selects the software keyboards SK21 and SK22 as the type of software keyboard to be displayed (step S107).

Then, the determiner 22 determines whether or not the smallest area Q2 determined as above is "0", i.e., whether or not the software keyboards SK21 and SK22 are displayable without overlap with the entry field IR and the reference field SR (step S108). When the determiner 22 determines that the software keyboards SK21 and SK22 are displayable without the overlap ("Yes" in step S108), the controller 21 allows the display panel 11 to display the software keyboards SK21 and SK22 on the screen and display the entry field IR and the reference field SR in the keyboard non-display region NR2 of the screen (step S109). Thus, the software keyboard is displayed without overlap with the entry field IR and reference field SR on the screen of the display panel 11.

On the other hand, when the determiner 22 determines that the smallest area Q2 is not "0" and the software keyboards SK21 and SK22 are not displayable without overlap with the entry field IR and the reference field SR ("No" in step S108), the controller 21 reduces each of the software keyboards SK21 and SK22 to a size falling within the keyboard non-display region NR2 and allows the reduced software keyboards SK21 and SK22 to be displayed within the keyboard non-display region NR2 as shown as an example in FIG. 7 (step S110).

In doing so, the controller 21 sets the rate of reduction of the software keyboards at such a value that the software keyboards fall within the keyboard non-display region and the keyboard size is maximized. Although the description in steps S108 to S109 has been given of the case where the software keyboards SK21 and SK22 are selected, the processing for size reduction and display is performed in the same manner also in the case where the software keyboards SK11 and SK12 are selected and in the case where the software keyboard SK31 is selected.

When, with the software keyboard displayed without overlap with the entry field IR and the reference field SR on the screen of the display panel 11 in the above manner, the user makes touch gestures on the software keyboard with reference to an image in the reference field SR to enter characters or symbols corresponding to the image into the entry field IR, the controller 21 executes the processing for image authentication.

If on the above general display device an opaque display where the display information is hidden by the software keyboard is made, the user cannot view the display information. Furthermore, if a see-through display where both the display information and the software keyboard are seen simultaneously in a layered relation is made, the visibility of the display information decreases. Therefore, these cases are inconvenient for the user who needs to operate the software keyboard while viewing the display information. For example, in the case of image authentication (CAPTCHA[SM]), a reference field for displaying an image representing characters or symbols and an entry field for entering the characters or symbols through the operation of the software keyboard are displayed together on the screen of the display panel. If the software keyboard overlaps with the reference field or the entry field on the screen of the display panel, the user cannot view the reference field or the entry field and, therefore, has difficulty doing data entry work for image authentication.

Unlike the above, in this embodiment, when the software keyboard is not displayable without overlap with the entry field and reference field on the screen of the display panel 11, the software keyboard is displayed in a form split into upper and lower portions, in a form split into left and right portions or in a partial form composed only of a portion of the software keyboard, and the entry field and the reference field are displayed in a region of the screen out of the software keyboard. Since in this manner the entry field and the reference field are displayed and the software keyboard is also displayed without overlap with the entry field and the reference field, the user can operate the software keyboard while viewing the entry field or the reference field to enter, into the entry field, characters or symbols corresponding to an image in the reference field.

Alternatively, it is also possible that the controller 21 does not execute the processing for bringing the entry field IR and the reference field SR close to one side of the screen of the display panel 11, the determiner 22 acquires the respective positions of the window W1, the entry field IR, and the reference field SR displayed on the screen of the display panel 11 in step S101 (step S104) and determines whether or not the software keyboard is displayable without overlap with the entry field IR and the reference field SR on the screen of the display panel 11 (step S105), and the controller 21 then executes the processing tasks in steps S107 to S109 according to the determination result in step S105.

Although in the above embodiment an entry field and a reference field for image authentication are taken as an example, the present disclosure can be applied also for the case where the software keyboard is displayed, concurrently with a plurality of entry fields, on the screen of the display panel. Thus, the software keyboard can be displayed without overlap with the plurality of entry fields. For example, also in the case where two entry fields IR11 and IR12 for entering an e-mail address twice as shown in FIG. 8 are displayed on the screen of the display panel 11, the software keyboards SK21 and SK22 obtained by splitting the software keyboard SK into left and right portions can be displayed without overlap with the entry fields IR11 and IR12.

Figure 3:
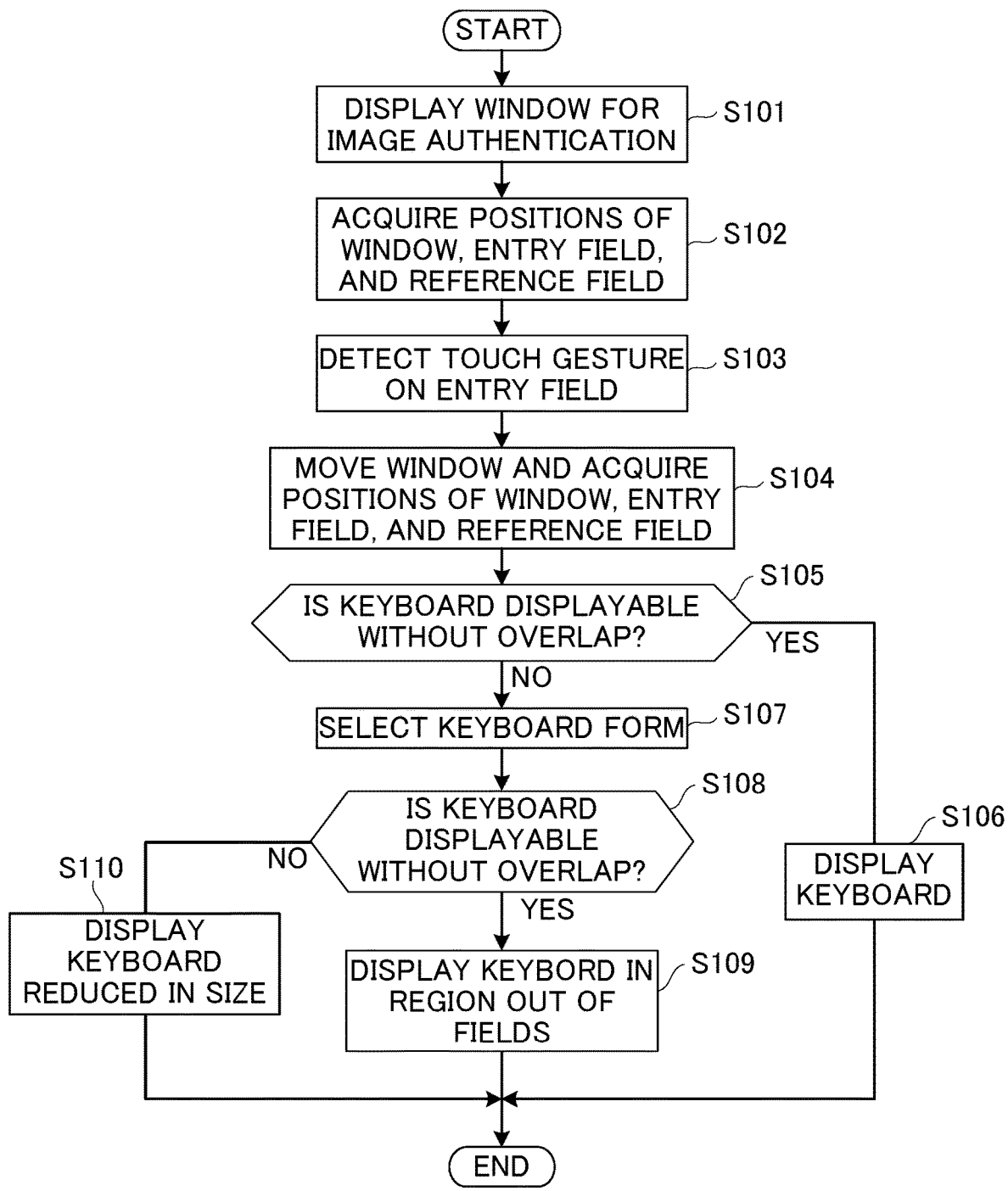
FIG. 3 is a flowchart showing processing for displaying a software keyboard without overlap with a reference field and an entry field.

Although in the above embodiment the software keyboard is split into two portions, such as upper and lower portions or left and right portions, the processing tasks shown in FIG. 3 can be applied also for the case where the software keyboard is displayed in a form split into three or more portions on the screen of the display panel 11.

The controller 21 may split the software keyboard by dividing the plurality of keys constituting the software keyboard into at least two groups according to the type of character or symbol associated with the respective keys. For example, as shown in FIG. 9, the controller 21 associates the keys of a software keyboard SK21, which is one of left and right software keyboards split from a preset software keyboard, mainly with characters and associates the keys of the other software keyboard SK22 mainly with symbols.

In omitting some of the keys of the software keyboard, the controller 21 may associate the respective characters or symbols associated with the omitted keys with respective non-omitted other keys to thus associate two types of characters or symbols with each of the other keys. For example, the controller 21 associates each of the keys in a top row of the software keyboard SK31 with one character and one number as shown in FIG. 10, thus enabling the selection of either character or number associated with each key through the operation of a shift key.

Although the description in the above embodiment has been given of the mobile terminal device 10 as an example, the display device according to the present disclosure may be any other type of electronic device.

The display method described in the above embodiment can be provided as a display control program stored in the above-described ROM or the storage device 18. This display control program is recorded on a non-transitory computer-readable recording medium, such as a hard disk, a CD-ROM, a DVD-ROM or a semiconductor memory. In this case, the non-transitory computer-readable recording medium with the display control program recorded thereon is one embodiment of the present disclosure.

The structure and processing of the above embodiment described with reference to FIGS. 1 to 10 are merely illustrative of the present disclosure and not intended to limit the present disclosure to the above particular structure and processing.

While the present disclosure has been described in detail with reference to the embodiments thereof, it would be apparent to those skilled in the art the various changes and modifications may be made therein within the scope defined by the appended claims.

What is claimed is:

1. A display device comprising:
    a display panel, and
    a control device that includes a processor and functions, through the processor executing a display control program, as:
    a determiner that determines, with a plurality of fields displayed on a screen of the display panel, whether or not an entire software keyboard is displayable without overlap with the plurality of fields on the screen of the display panel; and
    a controller that allows for, when the determiner determines that the entire software keyboard is displayable without overlap, display of the software keyboard without overlap with the plurality of fields or allows for, when the determiner determines that the entire software keyboard is not displayable without overlap, display of the software keyboard in a split form or display of the software keyboard in a partial form composed only of a portion of the software keyboard in a region of the screen out of the plurality of fields, wherein
    the determiner selects, from the software keyboard in the split form and the software keyboard in the partial form, one software keyboard free from overlap with the plurality of fields, and
    the controller allows the display panel to display the selected software keyboard and display the plurality of fields in a region of the screen out of the selected software keyboard.

2. The display device according to claim 1, wherein in displaying the software keyboard in the split form within the region of the screen out of the plurality of fields, the controller allows the display panel to display the software keyboard in a form split into upper and lower portions or left and right portions.

3. The display device according to claim 1, wherein in displaying the software keyboard in the split form within the region of the screen out of the plurality of fields, the controller allows the display panel to display the software keyboard in the split form by dividing a plurality of keys constituting the software keyboard into at least two groups according to type of character or symbol associated with the respective keys.

4. A display device comprising:
- a display panel, and
- a control device that includes a processor and functions, through the processor executing a display control program, as:
- a determiner that determines, with a plurality of fields displayed on a screen of the display panel, whether or not an entire software keyboard is displayable without overlap with the plurality of fields on the screen of the display panel; and
- a controller that allows for, when the determiner determines that the entire software keyboard is displayable without overlap, display of the software keyboard without overlap with the plurality of fields or allows for, when the determiner determines that the entire software keyboard is not displayable without overlap, display of the software keyboard in a split form or display of the software keyboard in a partial form composed only of a portion of the software keyboard in a region of the screen out of the plurality of fields, wherein
- the determiner selects, from the software keyboard in the split form and the software keyboard in the partial form, one software keyboard having a smaller area overlapping with the plurality of fields, and
- the controller reduces a size of the selected software keyboard to a size falling within the region of the screen out of the plurality of fields and allows the display panel to display the reduced software keyboard within the region of the screen out of the plurality of fields.

* * * * *